United States Patent
Kim et al.

(10) Patent No.: US 6,826,772 B2
(45) Date of Patent: Nov. 30, 2004

(54) DISK CLAMPING APPARATUS FOR DISK PLAYER

(75) Inventors: Seok-jung Kim, Gyeonggi-do (KR); Chong-sam Chung, Gyeonggi-do (KR); Yong-hoon Lee, Gyeonggi-do (KR); Han-kook Choi, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 147 days.

(21) Appl. No.: 10/263,817

(22) Filed: Oct. 4, 2002

(65) Prior Publication Data

US 2003/0107983 A1 Jun. 12, 2003

(30) Foreign Application Priority Data

Dec. 12, 2001 (KR) .................................. 10-2001-78670

(51) Int. Cl.[7] ............................................. G11B 17/028
(52) U.S. Cl. ........................................................ 720/710
(58) Field of Search ................................ 369/264, 270, 369/271; 360/99.05, 99.12; 720/706, 710

(56) References Cited

U.S. PATENT DOCUMENTS 4,951,277 A  *  8/1990  Masunaga et al. ........... 369/270

6,570,836 B2  *  5/2003  Yabushita ..................... 369/270

FOREIGN PATENT DOCUMENTS

| JP | 8-221860 | * | 8/1996 |
| JP | 11-66670 | * | 3/1999 |

* cited by examiner

*Primary Examiner*—David L. Ometz
(74) *Attorney, Agent, or Firm*—Staas & Halsey LLP

(57) ABSTRACT

A disk clamping apparatus for a disk player includes a turntable for receiving a disk, a disk clamper which clamps the disk placed on the turntable, and first and second magnetic bodies which are mounted in the corresponding turntable and the disk clamper and provide a clamping force to the disk by acting a reciprocal magnetic force on the turntable and the disk clamper. The first and second magnetic bodies are opposite to each other and partially overlap each other. In the disk clamping apparatus having the above structure, the variation in a clamping force caused by the variation in thickness of disks, received by the disk clamping apparatus, is very small. Accordingly, clamping and de-clamping of the disks having different thickness can be smoothly performed.

23 Claims, 5 Drawing Sheets

DISK CLAMPING APPARATUS FOR DISK PLAYER

CROSS-REFERENCE TO RELATED APPLICATIONS

This application claims the benefit of Korean Patent Application No. 2001-78670 filed on Dec. 12, 2001, in the Korean Intellectual Property Office, the disclosure of which is incorporated herein by reference.

BACKGROUND OF THE INVENTION

1. Field of the Invention

The present invention relates to a disk clamping apparatus for a disk player.

2. Description of the Related Art

Generally, a disk player is an apparatus which records/reproduces information on/from a recording medium such as a CD, a CD-ROM, or a DVD. FIG. 1 shows a conventional disk player having a deck base 40 which includes a hinge connected to a housing (not shown) so as to have the deck base 40 rotate in a vertical plane, a deck plate 20 under which predetermined clampers 30 are interposed to be connected to the deck base 40, a spindle motor 21 which is mounted in the deck plate 20 and provides a rotating force to a disk 1, a turntable 23 which is connected to a rotating axis 22 of the spindle motor 21 and on which the disk 1 is placed, a disk clamper 10 which is mounted in an upper portion of the housing so as to be opposite to the turntable 23 and clamps the disk 1 on the turntable 23, and an optical pickup 25 which is mounted to be transferred to the deck plate 20 in a direction of a radius of the disk 1 and performs a recording/reproducing operation.

FIG. 2 shows a partial cross-sectional view of the disk player shown in FIG. 1. The disk 1, which is placed on the turntable 23, is clamped between the turntable 23 and the disk clamper 10, and is rotated with the turntable 23 and the disk camper 10 as the spindle motor 21 rotates. During the rotation of the disk 1, the optical pickup 25 performs a recording/reproducing operation on a recording surface of the disk 1. A magnet 23a and a back yoke 23b are mounted in the turntable 23, and yokes 10a are mounted in the disk clamper 10. The disk 1 is clamped by a combination of magnetic forces of the yokes 10a.

The above disk clamping structure is based on a premise that a disk to be clamped has a uniform thickness of 1.2 mm. That is, since most disks used in a disk player have a thickness of 1.2 mm, the magnet 23a and the yokes 23b and 10a of the turntable 23 and the disk clamper 10 are designed to clamp the disks having the thickness of 1.2 mm.

Recently, however, with production of disks having high density and disk players having smaller and thinner dimensions, various changes in a disk thickness are expected and modified disks with different thicknesses have been already produced. Where a thickness of a disk is changed, it is difficult for the conventional clamping structure to accommodate the disk because a distance between the magnet 23a and the yoke 10a, which provide a clamping force, is changed. Accordingly, if the disk is thicker than 1.2 mm, the clamping force decreases, and the disk may be separated from the clamping structure of the disk player. On the other hand, if the disk is thinner than 1.2 mm, the clamping force increases, and the disk may not be smoothly released from the clamping structure of the disk player. Therefore, in the conventional clamping structure, it is very difficult to set an appropriate clamping force to cover a broad range of a thickness variation available among the disks.

Thus, there is a need for a disk clamping apparatus having a structure which reduces a variation in a clamping force caused by disks having a thickness variation, that is, different thicknesses.

SUMMARY OF THE INVENTION

Accordingly, it is an object of the present invention to provide a disk clamping apparatus for a disk player, which suppresses a variation in a clamping force caused by a variation in thickness of disks.

Additional objects and advantages of the invention will be set forth in part in the description which follows and, in part, will be obvious from the description, or may be learned by practice of the invention.

To achieve the above and other objects of the present invention, there is provided a disk clamping apparatus for a disk player, comprising a turntable for receiving a disk thereon, a disk clamper which clamps the disk placed on the turntable, and first and second magnetic bodies which are mounted in the turntable and the disk clamper, respectively, and provide a clamping force to the disk by acting a reciprocal magnetic force on the turntable and the disk clamper. The first and second magnetic bodies are positioned opposite to and partially overlap each other.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
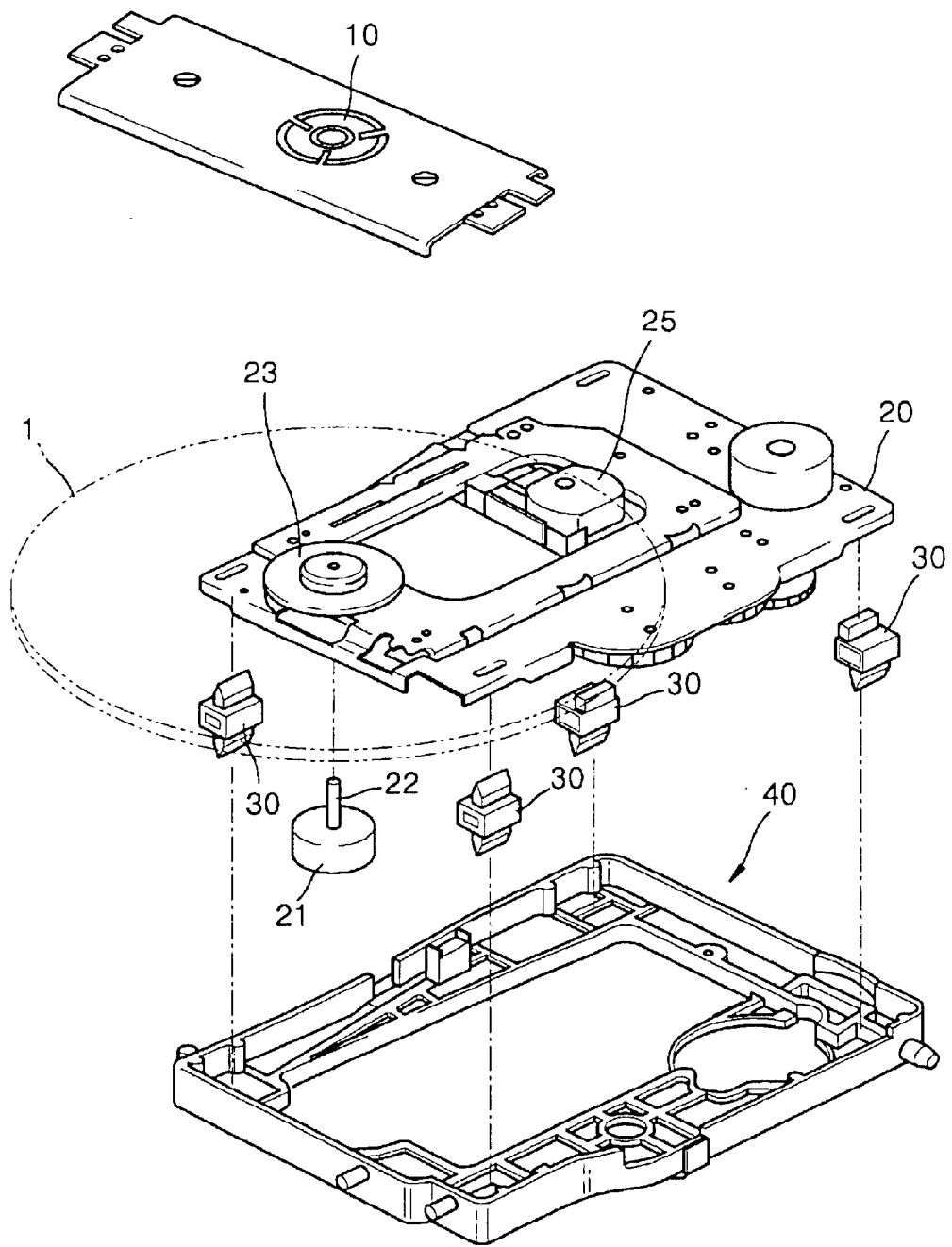
FIG. 1 is an exploded perspective view of a disk player having a conventional disk clamper.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
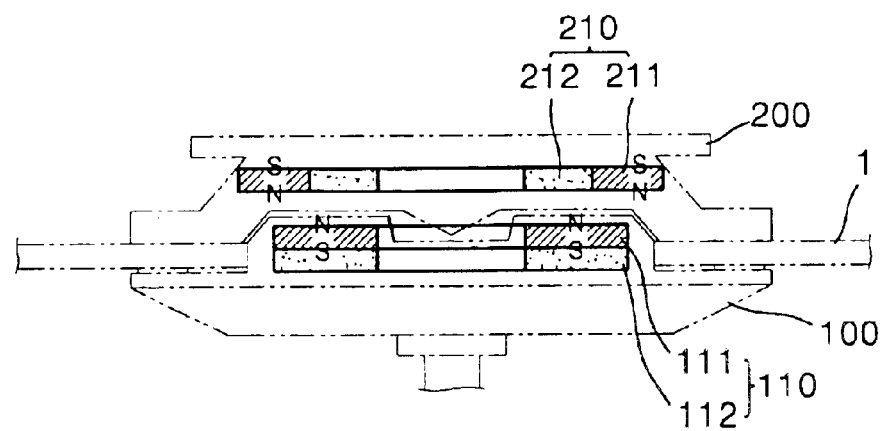
FIG. 3 is a partial cross-sectional view of a disk clamping apparatus according to an embodiment of the present invention.

FIG. 3 shows a partial cross-sectional view of a disk clamping apparatus according to an embodiment of the present invention. The disk clamping apparatus includes a turntable 100 which receives a disk 1, a disk clamper 200 which is arranged opposite to the turntable 100 and clamps the disk 1 placed on the turntable 100, and first and second magnetic bodies 110 and 210 which are mounted in the turntable 100 and the disk clamper 200, respectively, and provide a clamping force caused by acting magnetic forces of the first and second magnetic bodies 110 and 210.

The first magnetic body 110 includes a first magnet 111, and a first yoke 112 which is mounted on a bottom side of the first magnet 111. The second magnetic body 210 includes a second magnet 211, and a second yoke 212 which is positioned to be opposite to and overlaps an inner circular region of the first magnet 111. A magnetic attractive force acts between the first magnet 111 and the second yoke 212. The second magnet 211 is mounted on an external side of the second yoke 212, and a part of the second magnet 211 laps over, overlaps on top of, an outer circular region of the first magnet 111. The remaining part of the second magnet 211 is positioned to the outside of the first magnet 111, that is, extends beyond an outer edge of the first magnet 111.

The second magnet 211 has the opposite polarity to that of the first magnet 111 so as to have a magnetic repulsive force be generated in a region where the second magnet 211 is lapped over the first magnet 111. For example, where an upper side of the first magnet 111 has polarity N, a lower side of the second magnet 211 opposite to the upper side of the first magnet 111 also has polarity N. Accordingly, a magnetic repulsive force is generated in a region where the second magnet 211 is lapped over the first magnet 111. However, a magnetic flux from polarity N of the second magnet 211 to the first yoke 112 is formed in a non-lapping region, and thus another magnetic attractive force is generated between the first and second magnets 111 and 211.

Figure 5A:
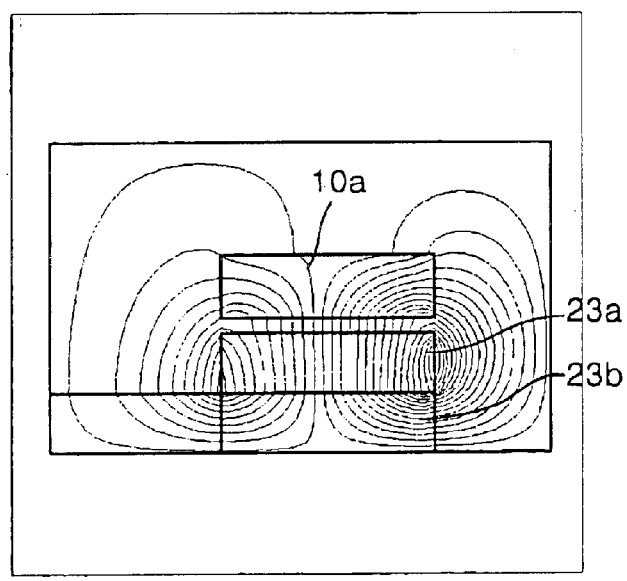
FIG. 5A is a diagram which illustrates the distribution of a magnetic flux, which is formed by the disk clamper shown in FIG. 2.
Figure 5B:
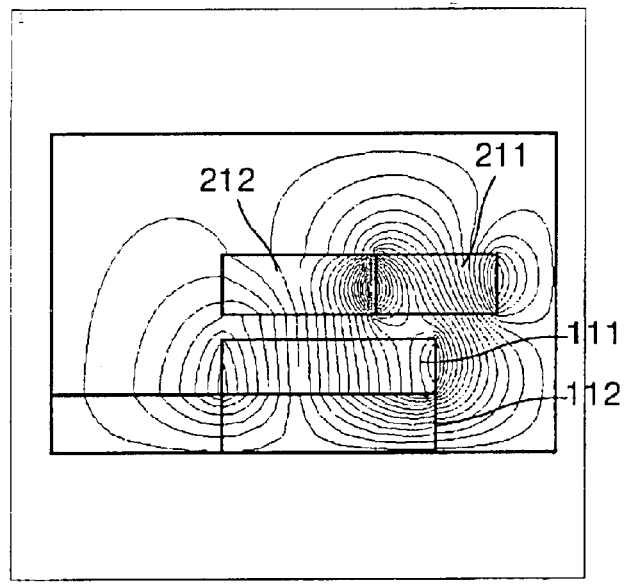
FIG. 5B is a diagram which illustrates the distribution of a magnetic flux, which is formed by the disk clamping apparatus shown in FIG. 3.

FIG. 5B illustrates a magnetic flux distribution formed by the configuration of the disk clamping apparatus shown in FIG. 3. As compared to a magnetic flux distribution of the prior art shown in FIG. 5A, for the conventional disk clamping apparatus shown in FIG. 2, FIG. 5B illustrates that a variation appears in the distribution of the magnetic flux in a region in which the second magnet 211 is mounted.

That is, in the prior art, only a magnetic attractive force acts between a magnet 23a and a back yoke 23b of the turntable 23 and a yoke 10a of the disk clamper 10, as illustrated by a conventional magnetic flux shown in FIG. 5A. In contrast, as shown in FIG. 5B for the disk clamping apparatus of FIG. 3, the distribution of the magnetic flux in which a magnetic repulsive force and an attractive force, which act between the first magnet 111 and the second magnet 211, is formed. It may be considered that the turntable 100 and the disk clamper 200 open by a magnetic repulsive force in a region lapped over the first and second magnets 111 and 211. However, the turntable 100 and the disk clamper 200 are mainly affected by the magnetic attractive force between the first magnet 111 and the second yoke 212, and the magnetic attractive force circulating from the second magnet 211 to the first yoke 112.

Figure 2:
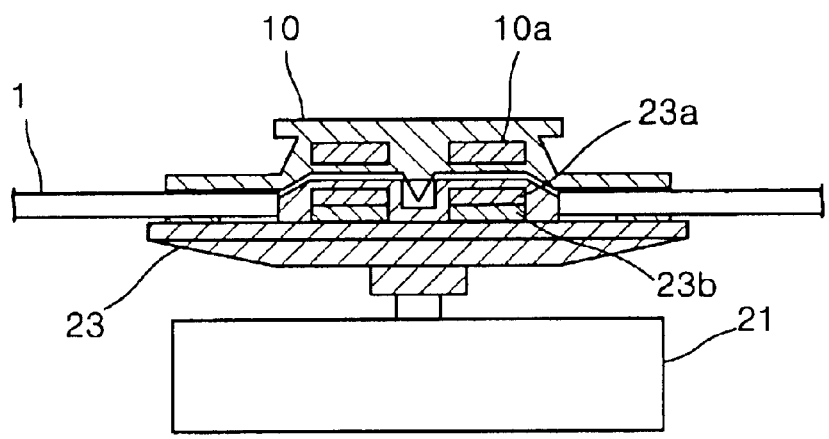
FIG. 2 is a partial cross-sectional view of the disk clamper of the disk player shown in FIG. 1.
Figure 6A:
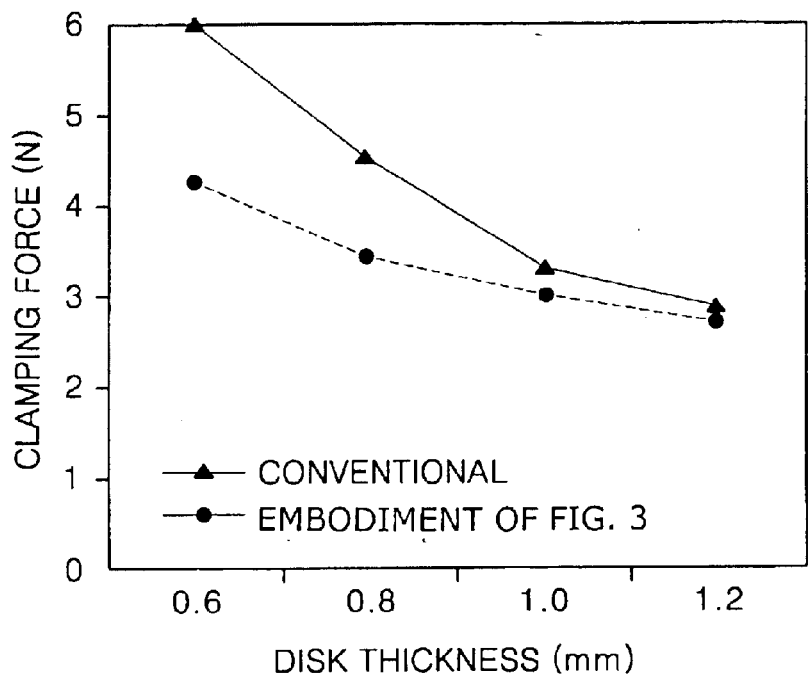
FIG. 6A is a graph illustrating a variation in a clamping force caused by a variation in thickness of disks for the disk clamping apparatuses shown in FIGS. 2 and 3.

FIG. 6A shows a variation in a clamping force caused by a variation in disk thickness for the disk clamping apparatuses shown in FIG. 2 and FIG. 3. Comparing the clamping forces caused by the first and second magnetic bodies 110 and 210 of the disk clamping apparatus shown in FIG. 3 with the conventional clamping forces shows that a maximum clamping force for the conventional disk clamping apparatus is larger than that of the disk clamping apparatus shown in FIG. 3. This is because a magnetic repulsive force acts on some intervals in the embodiment shown in FIG. 3. While the conventional clamping apparatus provides a larger clamping force for each disk thickness, a force variation between the disk thicknesses is high as indicated by a corresponding curve of FIG. 6A. In contrast, the instant disk clamping apparatus of FIG. 3 provides more consistent clamping force for each disk thickness, as indicted by a corresponding curve of FIG. 6A. Accordingly, the present disk clamping apparatus releases a clamping of a disk more smoothly than the conventional disk clamping apparatus, the release of which is less affected by a disk thickness than the conventional disk clamping apparatus.

For example, where a disk being clamped has a thickness of 0.6 mm, which is thinner than 1.2 mm, a clamping force of the conventional disk clamping apparatus excessively increases to over 5N. Accordingly, a clamping release operation becomes considerably difficult. In contrast, a clamping release operation can be more smoothly performed by the present disk clamping apparatus. In the prior art, the difference in a clamping force is about 2.5~3N where the thickness of the disk is changed from 1.2 mm to 0.6 mm. However, in the present invention, the difference in a clamping force is about 1~1.5N where the thickness of the disk is changed from 1.2 mm to 0.6 mm. With the present disk clamping apparatus, the variation in a magnetic force caused by the variation of a distance between the first and second magnetic bodies 110 and 210 is reduced by the variation in a distribution of magnetic flux shown in FIG. 5B. Thus, in the clamping apparatus of the present invention, the variation of a clamping force caused by the variation in thickness of disks is small, and thus clamping and de-clamping of various disks having different thicknesses can be smoothly performed.

Figure 4:
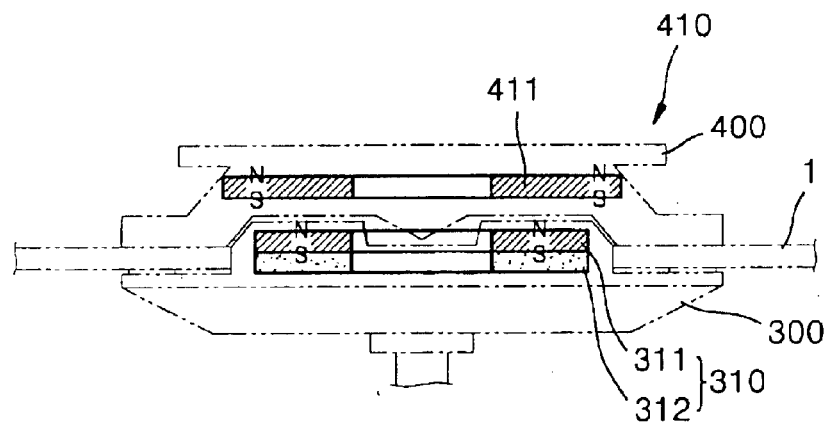
FIG. 4 is a partial cross-sectional view of a disk clamping apparatus according another embodiment of the present invention.

FIG. 4 shows a partial cross-section view of a disk clamping apparatus according to another embodiment of the present invention. The clamping apparatus includes first and second magnetic bodies 310 and 410, which have a lapped-over region, a dislocated region, and are opposite to each other. The first and second magnetic bodies 310 and 410 are mounted in a turntable 300 and a disk clamper 400, respectively.

The first magnetic body 310 includes a first magnet 311 and a first yoke 312. The second magnetic body 410 includes a second magnet 411. The second magnet 411 has a width wider than the first magnet 311, and thus a region of the second magnet 411 laps over the first magnet 311 and a non-lapped region of the second magnet 411 is further projected beyond an outer edge of the first magnet 311. The second magnet 411 has the same polarity arrangement as that of the first magnet 311 so as to generate a magnetic attractive force in the region lapped over the first magnet 311. For example, where an upper side of the first magnet 311 has polarity N, a lower side of the second magnet 411 opposite to the upper side of the first magnet 311 has polarity S.

Figure 5C:
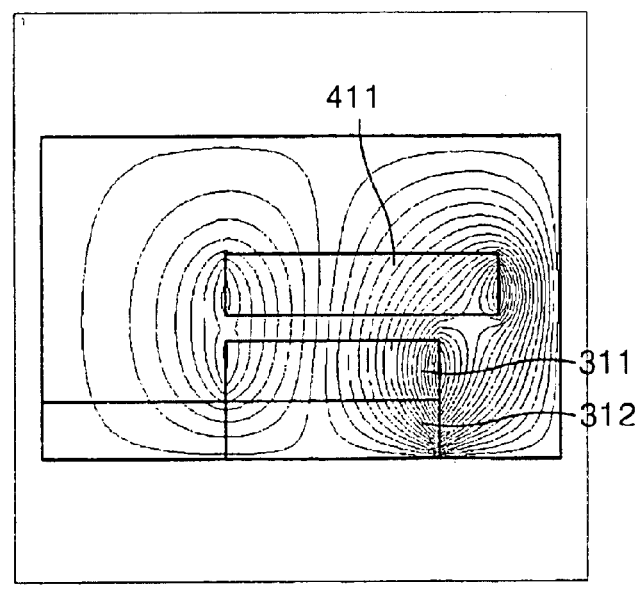
FIG. 5C is a diagram which illustrates the distribution of a magnetic flux, which is formed by the disk clamping apparatus shown in FIG. 4.

FIG. 5C illustrates a magnetic flux distribution formed by the configuration of the disk clamping apparatus shown in FIG. 4. As compared to the magnetic flux distribution of the prior art shown in FIG. 5A, FIG. 5C illustrates that there is no distribution of the magnetic flux on an external side of the second magnet 411, that is, in a region where the second magnet 411 is not lapped over the first magnet 311 and is further projected beyond the outer edge of the first magnet 311. Here, a magnetic force circulating between the polarity N and S affects more strongly on the region than a magnetic force formed between the first and second magnets 311 and 411. However, the magnetic attractive force circulating from the second magnet 411 to the first yoke 312 acts beyond the region.

Figure 6B:
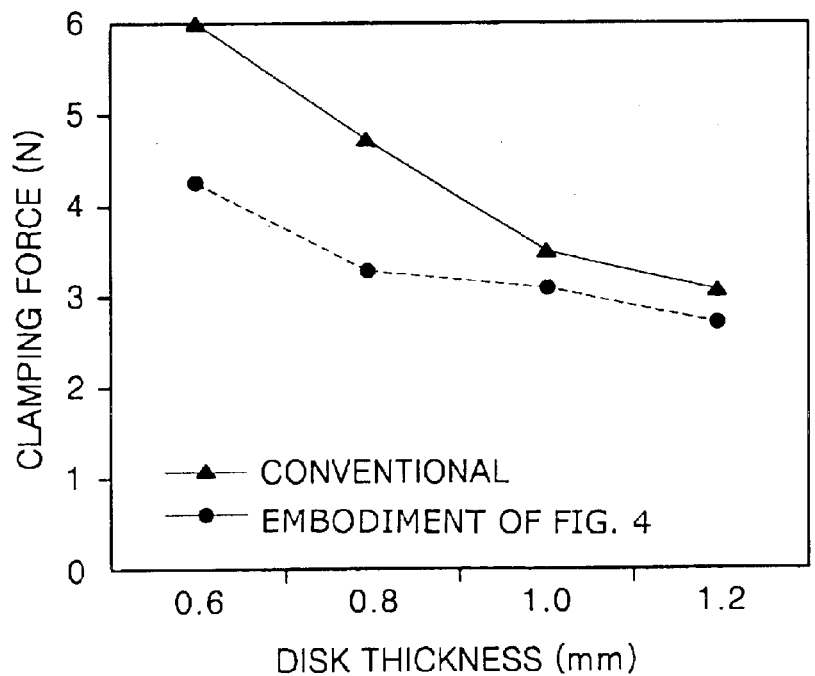
FIG. 6B is a graph illustrating a variation in the clamping force caused by a variation in thickness of disks for the disk clamping apparatus shown in FIGS. 2 and 4.

FIG. 6B shows a variation in a clamping force caused by a variation in disk thickness for the disk clamping apparatuses shown in FIG. 2 and FIG. 4. Comparing the clamping forces caused by the first and second magnetic bodies 310 and 410 of the disk clamping apparatus shown in FIG. 4 with the conventional clamping forces shows that a maximum clamping force for the conventional disk clamping apparatus is larger than that of the instant disk clamping apparatus shown in FIG. 4. However, the variation in the clamping force caused by the variation in the disk thickness is more stable for the instant disk clamping apparatus than that of the prior art.

That is, in the prior art, the difference in a clamping force is about 2.5~3N where the thickness of a disk is changed from 1.2 mm to 0.6 mm. In comparison, with the embodiment of FIG. 4, the variation in a clamping force is about 1~1.5N where the thickness of a disk is changed from 1.2 mm to 0.6 mm. That is, with the embodiment of FIG. 4, the variation in a magnetic force caused by the variation of a distance between the first and second magnetic bodies 310 and 410 is reduced by the variation in a distribution of magnetic flux shown in FIG. 5C. Additionally, in the disk clamping apparatus shown in FIG. 4, the variation of a clamping force caused by the variation in the disk thickness is small, and thus clamping and de-clamping of various disks having different thicknesses can be smoothly performed. Even in the case of employing a disk having a thickness of 0.6 mm, a clamping force does not excessively increase, and thus clamping and de-clamping can be smoothly performed.

As described above, in a disk clamping apparatus according to the present invention, the variation in a clamping force caused by the variation in thickness of disks is reduced. Accordingly, clamping and de-clamping of disks can be smoothly performed even though the disks have different thicknesses.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A disk clamping apparatus for a disk player, the apparatus comprising:
    a turntable for receiving a disk thereon;
    a disk clamper which clamps the disk placed on the turntable; and
    first and second magnetic bodies, which are mounted in the turntable and the disk clamper, respectively, and which provide a clamping force to the disk, which is substantially equal to a sum of reciprocal attractive and repulsive magnetic forces on the turntable and the disk clamper, wherein the first and second magnetic bodies are positioned opposite to, and partially overlap each other.

2. The apparatus of claim 1, wherein the first and second magnetic bodies positioned opposite to each other define a region, generate a magnetic attractive force on an inner circular region of the region, and generate a magnetic repulsive force on an outer circular region of the region.

3. The apparatus of claim 1, wherein the first and second magnetic bodies have a circular disc shape and have a different radius.

4. The apparatus of claim 1, wherein the first and second magnetic bodies have a variation in a distribution of magnetic flux acting in a region around the first and second magnetic bodies, so as to reduce a variation of the clamping force caused by a variation of a distance between the first and second magnetic bodies.

5. The apparatus of claim 1, wherein one or more magnetic repulsive and attractive forces act between the first and second magnetic bodies to reduce a variation of the clamping force caused by a variation of a distance between the first and second magnetic bodies.

6. The apparatus of claim 1, further comprising first and second magnets in the first and second magnetic bodies to provide a magnetic repulsive force to each other, wherein the magnetic repulsive force acts on a region where the second magnet is opposite to and overlaps the first magnet.

7. A disk clamping apparatus for a disk player, the apparatus comprising:
    a turntable for receiving a disk thereon:
    a disk clamper which clamps the disk placed on the turntable; and
    first and second magnetic bodies which are mounted in the turntable and the disk clamper, respectively, and provide a clamping force to the disk by acting a reciprocal magnetic force on the turntable and the disk clamper, wherein the first and second magnetic bodies are positioned opposite to, and partially overlap each other, wherein
    the first and second magnetic bodies positioned opposite to each other define a region, generate a magnetic attractive force on an inner circular region of the region, and generate a magnetic repulsive force on an outer circular region of the region,
    the first magnetic body including a first magnet, and a first yoke mounted on a bottom side of the first magnet, and the second magnetic body including a second yoke which is positioned to be opposite to an inner circular region of the first magnet, and a second magnet which is mounted on an external side of the second yoke and
    an ending part of an external side of the second magnet is positioned to overpass an outer circular region of the first magnet, and the second magnet has a polarity so as to have the magnetic repulsive force act on a region opposite to the first magnet.

8. The apparatus of claim 7, wherein the first and second magnetic bodies generate another magnetic attractive force which circulates from the second magnet to the first yoke.

9. The apparatus of claim 7, wherein the second magnet has the opposite polarity arrangement to that of the first magnet.

10. The apparatus of claim 7, wherein the magnetic attractive force acts between the first magnet and the second yoke.

11. A disk clamping apparatus for a disk player, the apparatus comprising:
    a turntable for receiving a disk thereon;
    a disk clamper which clamps the disk placed on the turntable; and
    first and second magnetic bodies which are mounted in the turntable and the disk clamper, respectively, and provide a clamping force to the disk by acting a reciprocal magnetic force on the turntable and the disk clamper, wherein the first and second magnetic bodies are positioned opposite to, and partially overlap each other, and the first magnetic body includes:
   a first magnet; and
   a first yoke mounted on a bottom side of the first magnet, and the second magnetic body includes a second magnet which has a width wider than a width from a maximum inner circular region of the first magnet to a maximum outer circular region of the first magnet, and has a polarity so as to have a magnetic attractive force act in a region lapped over the first magnet.

12. The apparatus of claim 11, wherein the second magnet has the same polarity arrangement to that of the first magnet.

13. The apparatus of claim 11, wherein the magnetic attractive force acts in a region where the second magnet is lapped over the first magnet.

14. A disk clamping apparatus for a disk player, the apparatus comprising:
   a turntable for receiving a disk;
   a disk clamper which clamps the disk received by the turntable; and
   first and second magnetic bodies, which are provided in the turntable and the disk clamper, respectively, and which supply a clamping force to the disk which is substantially equal to a sum of reciprocal attractive and repulsive magnetic forces on the turntable and the disk clamper, wherein the first and second magnetic bodies partially overlap each other in response to the turntable and the disk clamper being concentrically aligned to each other.

15. A disk clamping apparatus for a disk player, the apparatus comprising:
   a turntable for receiving a disk;
   a disk clamper which clamps the disk received by the turntable; and
   first and second magnetic bodies, which are provided in the turntable and the disk clamper, respectively, and which supply a clamping force to the disk which is substantially equal to a sum of reciprocal attractive and repulsive magnetic forces on the turntable and the disk clamper, wherein the first and second magnetic bodies partially overlap each other in response to the disk clamper being placed over the turntable in a disk clamping position.

16. A disk clamping apparatus for a disk player, the apparatus comprising:
   a turntable for receiving a disk;
   a disk clamper which clamps the disk received by the turntable; and
   first and second magnetic bodies, which are provided in the turntable and the disk clamper, respectively, and which supply a clamping force to the disk which is substantially equal to a sum of reciprocal attractive and repulsive magnetic forces on the turntable and the disk clamper, wherein the first and second magnetic bodies partially overlap each other in response to the first and second magnetic bodies being concentrically aligned with each other.

17. The apparatus of claim 16, wherein the first and second magnetic bodies define a region, generate a magnetic attractive force on an inner circular region of the region, and act a magnetic repulsive force on an outer circular region of the region.

18. A disk clamping apparatus for a disk player, the apparatus comprising:
   a turntable for receiving a disk:
   a disk clamper which clamps the disk received by the turntable; and
   first and second magnetic bodies provided in the turntable and the disk clamper, respectively, and supply a clamping force to the disk by generating a reciprocal magnetic force on the turntable and the disk clamper, wherein the first and second magnetic bodies partially overlap each other in response to the first and second magnetic bodies being concentrically aligned with each other, wherein the first and second magnetic bodies define a region, generate a magnetic attractive force on an inner circular region of the region, and act a magnetic repulsive force on an outer circular region of the region, the first magnetic body including a first magnet; and a first yoke mounted on a bottom side of the first magnet, and the second magnetic body including a second yoke which is positioned opposite to and overlaps an inner circular region of the first magnet, and a second magnet which is mounted on an external side of the second yoke, and an ending part of an external side of the second magnet is positioned to overpass an outer circular region of the first magnet, and the second magnet has a polarity so as to have the magnetic repulsive force act on a region opposite to the first magnet.

19. A disk clamping apparatus for a disk player, the apparatus comprising:
   a turntable for receiving a disk;
   a disk clamper which clamps the disk received by the turntable; and
   first and second magnetic bodies provided in the turntable and the disk clamper, respectively, and supply a clamping force to the disk by generating a reciprocal magnetic force on the turntable and the disk clamper, wherein the first and second magnetic bodies partially overlap each other in response to the first and second magnetic bodies being concentrically aligned with each other, and the first magnetic body includes:
   a first magnet; and
   a first yoke mounted on a bottom side of the first magnet, and the second magnetic body includes a second magnet which has a width wider than a width from a maximum inner circular region of the first magnet to a maximum outer circular region of the first magnet, and has a polarity so as to have a magnetic attractive force act in a region lapped over the first magnet.

20. A disk clamping apparatus for a disk player, the apparatus comprising:
   a turntable for receiving a disk;
   a disk clamper which clamps the disk received by the turntable; and
   first and second magnetic bodies, which are provided in the turntable and the disk clamper, respectively, and which supply a clamping force to the disk which is substantially equal to a sum of reciprocal attractive and repulsive magnetic forces on the turntable and the disk clamper, wherein the first and second magnetic bodies provide a variation in a distribution of magnetic flux acting in a region around the first and second magnetic bodies in a disk clamping position, so as to reduce a variation of the clamping force caused by a variation of a distance between the first and second magnetic bodies.

21. The apparatus of claim 20, wherein the first and second magnetic bodies are positioned opposite to and partially overlap each other in the disk clamping position.

22. A disk clamping apparatus for a disk player, the apparatus comprising:

a turntable for receiving a disk;

a disk clamper which clamps the disk received by the turntable; and first and second magnetic bodies, which are provided in the turntable and the disk clamper, respectively, and which supply a clamping force to the disk which is substantially equal to a sum of reciprocal attractive and repulsive magnetic forces on the turntable and the disk clamper, wherein the first and second magnetic bodies provide magnetic repulsive and attractive forces therebetween, in a disk clamping position, so as to reduce a variation of the clamping force caused by a variation of a distance between the first and second magnetic bodies.

23. The apparatus of claim 22, wherein the first and second magnetic bodies are positioned opposite to and partially overlap each other in the disk clamping position.

* * * * *